2,715,646

MANUFACTURE OF DIISOPROPYLBENZENE HYDROPEROXIDES

Edwin George Edward Hawkins, Lower Kingswood, Tadworth, Denis Cheselden Quin, Epsom, and Francis Edward Salt, Banstead, England, assignors, by mesne assignments, to Hercules Powder Company, a corporation of Delaware No Drawing. Application May 9, 1949,
Serial No. 92,257

11 Claims. (Cl. 260—610)

The present invention relates to an improvement in and a process for the manufacture of organic oxidation products and refers in particular to the manufacture of peroxidic compounds of di-isopropyl benzene. In our co-pending application Serial No. 32,998, filed June 14, 1948, now abandoned, there is described a process for the manufacture of peroxidic compounds of di-isopropyl benzene by the action of molecular oxygen upon a dispersion of di-isopropyl benzene in water at temperatures exceeding 60° C. preferably 80 to 95° C.

It has now been discovered that the oxidation of di-isopropyl benzene may be carried out when the molecular oxygen is reacted with liquid di-isopropyl benzene in the substantial absence of water at temperatures between 110 and 140° C.

In accordance with this invention the process of oxidising di-isopropyl benzene comprises bringing molecular oxygen or molecular oxygen-containing gases into intimate contact with di-isopropyl benzene in the substantially homogeneous liquid phase at temperatures between 110 and 140° C., preferably between 120 and 130° C. in the substantial absence of oxidation catalysts other than organic peroxides, and recovering the hydroperoxides from the reaction liquid.

The molecular oxygen may be in the form of pure oxygen, of a mixture rich in oxygen, or air. It is advantageous to adjust the quantity of oxygen-containing gas in such a way that an excess of oxygen over that absorbed by the reaction mixture is introduced therein. The excess may vary within wide limits. It has been found that it is advantageous to have an excess of about 10%, whereas the upper limit is given by economic considerations. It has also been found advantageous to add to the reacting mixture small quantities of an alkaline substance such as sodium hydroxide, which addition assists the oxidising reaction. During the oxidation acids or acidic substances, such as formic acid, may be produced which interfere with the oxidation reaction and which by the addition of alkaline substances are neutralised and thus made innocuous. It is preferred to add the alkaline substances in the form of aqueous solutions or suspension. The steam produced by the vaporisation of the water of the said solution helps to remove the acidic substances formed by entraining them. Furthermore, the steam thus produced reduces the risk of explosions which arises from the fact that the space in the reactor above the reaction mixture contains a mixture of oxygen and di-isopropyl benzene vapours.

The amount of the water in the alkaline solution may be regulated in such a way that all the steam necessary for reducing the risks of explosion in the vapour space may be generated therefrom. It is also possible to introduce water or steam in addition to the aqueous alkaline solution into the reacting mixture in order to achieve the complete removal or a substantial reduction of said risks. The total quantity of water added to the liquid di-isopropyl benzene either as water or in the form of aqueous alkaline solution is kept within such limits that little or no separate aqueous phase is formed in the liquid mixture subjected to the action of the gaseous oxygen. In the former case the aqueous phase is present in the form of a concentrated alkali metal hydroxide solution. Furthermore, steam may be introduced into the vapour space above the reacting mixture in order to obviate explosion dangers.

It has been found, furthermore, that, after the oxidation of the di-isopropyl benzene has been proceeding for some time and a certain amount of the peroxide compounds have been produced, decomposition in the reaction mixture takes place. It is, therefore, an additional feature of the invention to terminate the introduction of molecular oxygen into the reaction mixture before substantial amounts are decomposed, since the decomposition makes the reaction uneconomical.

The commercially available di-isopropyl benzene which is obtained as a by-product in the manufacture of iso-propyl benzene by the condensation of propylene and benzene consists of a mixture of the isomeric para-, meta- and ortho-di-isopropyl benzenes. The boiling points of the meta- and ortho-isomers are almost identical, but the para-isomer boils about 7° C. higher at ordinary pressure. Hence by very careful fractionation relatively pure para-fractions can be obtained, together with mixtures of meta- and ortho-isomers. By ordinary distillation very little separation occurs. Consequently the proportion of isomers in a distillate depends on the method of distillation. The determination by spectroscopic analysis of a commercially available sample disclosed the following amounts before the oxidation of the material was carried out: ortho-di-isopropyl benzene 18%, meta- 20% and para- 61%.

It has been found that the oxidation reaction takes place most readily with the para-di-isopropyl benzene which is comparatively easily converted into the peroxidic compounds. The meta-di-isopropyl benzene is oxidised much less easily, whereas the ortho-di-isopropyl benzene is either not oxidised at all or to a very small extent only. The molecular oxygen reacts with para-di-isopropyl benzene by forming di-isopropyl benzene mono-hydroperoxide but at the same time quantities of the di-hydroperoxides of the para-di-isopropyl benzene are formed the proportions of which depend on the extent to which the oxidation is carried out. On continuing the introduction of oxygen into the reaction mixture a further quantity of the para-mono-hydroperoxide is converted into its di-hydroperoxide.

The amount of oxygen-containing gases introduced is adjusted according to the proportion of mono- or di-peroxide which it is required to produce and it is necessary to find out by experiment after what time the introduction of the oxygen-containing gases is to be terminated in order to get optimum results. The optimum amount of peroxide production in the reaction mixture may be determined by analysis during the course of the reaction.

The reaction of the oxygen containing gases upon the meta-substituted product proceeds in a similar way to that described for the para-product, that is in the first instance a mono-hydroperoxide will be formed with, at the same time or subsequently, the production of small quantities of the di-hydroperoxide. The reaction between meta-di-isopropyl benzene and the molecular oxygen, however, proceeds much more slowly than the oxidation of the para-di-isopropyl benzene, as already pointed out.

The separation of the di-hydroperoxides from the mono-hydroperoxides in the oxidation product is made possible by the difference in behaviour towards dilute alkali metal hydroxide solutions such as potassium hydroxide or preferably sodium hydroxide. Thus, it has been found that whereas the di-hydroperoxides are soluble in about 10% aqueous sodium hydroxide, the monohydroperoxides are substantially insoluble in alkaline solutions of a strength below 15%. The di-hydroperoxides when dissolved in aqueous caustic soda solutions exist as their sodium salts and they may be recovered therefrom as free hydroperoxides by the neutralisation of their sodium salt solutions by the addition of a dilute or weak acid, preferably to a pH of between 6.5 and 8, avoiding undue rise of temperature which may conveniently be effected by passing carbon dioxide through the aqueous solution until a purple colour is shown by blue litmus paper dipped therein.

When the crude oxidate is cooled, most of the para-di-hydroperoxide crystallises out from the solution, but it may be substantially completely separated from the other oxidation products by the addition of benzene or petrol ether to the crude oxidised mixture, which addition causes its precipitation.

The pure para-di-isopropyl benzene di-hydroperoxide forms white crystals which fuse at 143 to 144° C.

The meta-di-hydroperoxide is then recovered from the solution which is substantially free from the para-di-hydroperoxide by extracting the solution with aqueous alkali metal hydroxide solution such as sodium hydroxide of a strength of about 10%. By evaporation of the aqueous alkaline extract preferably at temperatures below 50° C. the pure sodium salt of the meta-di-hydroperoxide crystallises out and may be separated in a substantially pure state. The meta-di-hydroperoxide may be recovered from the aqueous solution of its alkali metal salt by neutralisation with acid as described above. The pure meta-di-hydroperoxide melts at 61 to 62° C.

The mono-hydroperoxides which are left in the oxidised mixture after the di-hydroperoxides have been removed therefrom consist of the para- and meta-derivatives, with possible traces of the ortho-isomer. The para-mono-hydroperoxide may be partially isolated as its alkali metal salt, preferably sodium salt, by agitating the solution with limited successive quantities of aqueous sodium hydroxide solution of a concentration of more than 15%, preferably 40 to 50%. This causes preferential precipitation of the sodium salt of the para-mono-hydroperoxide, while some free para-mono-hydroperoxide remains in the solution together with the whole of the meta-mono-hydroperoxide. If at this stage the major part of the unreacted di-isopropyl benzene is removed by distillation under reduced pressure and petrol ether (boiling point 60 to 80° C.) is added thereto, together with further quantities of 40 to 50% sodium hydroxide solution the sodium salts of the para- and meta-mono-hydroperoxides are precipitated as a mixture.

If pure meta-mono-hydroperoxide is required it may be obtained by the oxidation of a mixture of isomeric di-isopropyl benzenes which have been freed from para-di-isopropyl benzene by very careful fractionation.

The sodium salts of both the para- and the meta-mono-hydroperoxides can be converted to the free mono-hydroperoxides by hydrolysis with water or by neutralisation with dilute acids. The para-mono-hydroperoxide has a melting point of 26.5° C. The meta-mono-hydroperoxide has been obtained as a liquid of 97% purity and having a boiling point of 70 to 74° C. at 0.002 mm. Hg.

The completeness of the separation by the methods described above, however, depends to a certain extent on the relative proportions of the isomers present in the oxidised hydrocarbon mixture and on the concentrations of the peroxides in the solution.

The oxidation process of the invention may be carried out batch wise or in a continuous manner.

The following examples illustrate the way in which the process of the invention may be carried out in practice:

Example 1

Commercial di-isopropyl benzene of a boiling range of 201°–212° C. was used. This material was then hydrogenated over Raney nickel to remove substantially all unsaturation of a non-aromatic type, and the oxidations were effected after filtering it free from the nickel catalyst. Two hundred and fifty grams of the distilled hydrogenated mixed di-isopropyl benzenes, which had the composition 18% ortho-, 20% meta- and 61% para-, as shown by infra-red absorption spectroscopy, were put in a 1 litre three-necked flask fitted with a mercury-sealed stirrer, thermometer and an inlet and an outlet for oxygen gas, the whole being immersed in a thermostatic bath held at 125° C.

Oxygen from a cylinder was metered into the reaction vessel and unconsumed oxygen was metered out. The following table gives the rate of oxygen absorption, and the increase in peroxide concentration, expressed as grams of di-isopropyl benzene mono-hydroperoxide present in 100 cc. of the oxidising mixture.

| Duration, Hours | Half-hourly Rate of Absorption, cc./min. | Peroxide Content, Percent w./v. |
|---|---|---|
| 1.5 | 27 | 4.32 |
| 2.25 | 68 | 9.47 |
| 3.25 | 73 | 16.32 |

The oxidation was stopped at this point since the rate of absorption began to drop rapidly and the peroxide concentration to decrease. Of the oxygen absorbed approximately 60% could be accounted for as peroxide.

Example 2

This example was carried out with a similar material and in the same apparatus as Example 1. The only difference was that soon after the oxygen absorption had begun one drop (0.1 cc.) of 38% aqueous caustic soda was added.

| Duration, Hours | Half-hourly Rate of Absorption, cc./min. | Peroxide Content, Percent w./v. |
|---|---|---|
| 2.25 | 33 | 6.26 |
| 3.0 | 85 | 12.63 |
| 4.5 | 112 | 38.0 |

It can be seen that the oxidation proceeded much faster in the presence of alkali than in Example 1 where no alkali was present. Of the oxygen consumed, approximately 88% could be accounted for as peroxide.

Example 3

In this example the distilled and hydrogenated diisopropyl benzene of the previous examples was carefully fractionated in a 100-plate column and separated into several fractions. By infra-red spectroscopic analysis, a fraction consisting of 43.5% ortho- and 52.5% meta-diisopropyl benzenes, free of the para-derivative but with 4% of an unidentified constituent, was selected for oxidation. The apparatus was similar to that of Examples 1 and 2, but the flask was of 150 cc. capacity instead of 1 litre. In order to overcome the extremely long induction period, 1 cc. isopropyl benzene hydroperoxide was added after 2 hours.

| Duration, Hours | Hourly rate of absorption, cc./min. | Peroxide Content, Percent w./v. |
|---|---|---|
| 4 | 3.3 | 4.5 |
| 6 | 7.0 | 10.0 |
| 10 | 15.1 | 31.4 |

Of the oxygen consumed approximately 73% could be accounted for as peroxide and the unreacted di-isopropyl benzene recovered from the oxidation comprised 57% of the ortho-isomer, 36% of the meta- and 7% of the unidentified constituent.

Example 4

In this example, another fraction of the di-isopropyl benzene fractionated as described in Example 3 was taken, of boiling point 210° C./760 mm. This fraction was found to be 100% para-di-isopropyl benzene by infra-red spectroscopic analysis. The oxidation of this fraction was preceded by a period during which no oxygen was absorbed; on adding 0.05 gram of para-di-isopropyl benzene hydroperoxide after 70 minutes absorption immediately began.

| Duration | Half-hourly Rate of absorption, cc./min. | Peroxide Content, Percent w./v. |
|---|---|---|
| 1.16 | 0 | 0 |
| 2.0 | <1 | |
| 3.75 | 26 | 11.3 |
| 4.0 | 225 | 25.6 |
| 5.0 | 80 | 63.5 |

Of the oxygen consumed, approximately 75% could be accounted for as peroxide. The reaction mixture on cooling set almost solid owing to the crystallisation of the para-di-peroxide.

The two following examples illustrate the separation of the peroxides from the product of the oxidation.

Example 5

On cooling, the product resulting from Example 2 deposited 13.7 grams of a crystalline solid having a M. P. 143° C. (decomposition) after recrystallisation from a mixture of ether and benzene. Its peroxide value agreed with its being a di-hydroperoxide of molecular weight 230 (theory 226 for di-isopropyl benzene di-hydroperoxide) and its chemical reactions indicated it to be the para-isomer.

After filtering off this solid the filtrate was washed with two lots of 10% caustic soda; the alkaline washes on passing carbon dioxide through them in excess yielded a further 1.3 grams of solid di-isopropyl benzene di-hydroperoxide.

When the alkali-washed hydrocarbon layer was shaken with a little 50% caustic soda, the whole became solid. On pressing the solid on a suction filter and washing it repeatedly with dry ether to free it from occluded unchanged di-isopropyl benzene and any other products of the reaction, it was found to be the sodium salt of para-di-isopropyl benzene mono-hydroperoxide. This sodium salt was hydrolysed on contacting with water at 30° C. to a free peroxide (M. P. 26.5°) whose peroxide value agreed with its being a mono-hydroperoxide of molecular weight 194 (theory 194 for di-isopropyl benzene mono-hydroperoxide).

The solution of the unchanged di-isopropyl benzene and other products of the oxidation, obtained by washing the para-hydroperoxide sodium salt with ether as described, was treated with more 50% caustic soda, but no immediate precipitation of sodium salt occurred. A sample of this alkali-treated solution, on standing for four days, deposited some more sodium salt of the mono-hydroperoxide. The bulk of the solution, however, immediately after the last wash with 50% NaOH, was distilled at about 0.005 mm. of mercury, giving, after the removal of di-isopropyl benzene and solvents, a fraction of boiling range 64–69° C. weighing 18.3 grams containing 84% of a mixture of mono-hydroperoxides found to be those of the para- and meta-di-isopropyl benzenes.

Example 6

80 grams of the oxidised product obtained according to Example 3, which by titration contained 47% of peroxide calculated as mono-hydroperoxides, was distilled at 0.1 mm. pressure until a major proportion of the unreacted di-isopropyl benzene had been removed. This was replaced by petroleum ether of a boiling range of 60–80° C. On shaking this petroleum ether solution with one-fifth of its volume of 10% aqueous caustic soda, separating the aqueous layer and evaporating most of the water therefrom at 30° C. under reduced pressure, a thick deposit of crystalline sodium salt of a di-hydroperoxide formed which after filtration and washing with petroleum ether was hydrolysed by passing $CO_2$ into its solution in water. The free di-hydroperoxide so produced was extracted with ether and on evaporation of the ether after drying over anhydrous $MgSO_4$ yielded a solid, M. P. 62° C. which from its chemical reactions was found to be meta-di-isopropyl benzene di-hydroperoxide.

The petroleum ether solution after treatment with aqueous 10% sodium hydroxide solution was shaken with one-tenth its volume of a 50% aqueous solution of NaOH. Most of this aqueous solution dissolved completely in the petrol solution, and on cooling a part of the mixture to −30° C. a thick deposit of a solid sodium salt was formed; on adding this to the bulk of the mixture at room temperature the whole mass gradually filled with this sodium salt, which after filtering, washing with petrol and suspending in water slowly hydrolysed to a free mono-hydroperoxide. This on distilling yielded a liquid boiling between 70°–74° C. at about 0.002 mm. Hg which had a peroxide equivalent of 198 and was found to be meta-di-isopropyl benzene mono-hydroperoxide.

We claim:

1. Process for the manufacture of di-isopropyl benzene hydroperoxides which comprises bringing di-isopropyl benzene in the substantially homogeneous liquid phase at temperatures between 110° and 140° C. into intimate contact with free oxygen-containing gases in the substantial absence of oxidation catalysts other than organic peroxides, adding to the reaction mixture alkaline substances which react with acid substances formed during the oxidation reaction, whereby these acid substances are neutralized, removing the para- and meta-di-isopropyl benzene di-hydroperoxides from the liquid reaction mixture, then treating the remaining reaction mixture with aqueous sodium hydroxide solution of concentration exceeding 15 per cent whereby the sodium salt of the para-di-isopropyl benzene mono-hydroperoxide is precipitated and recovering the meta-mono-hydroperoxide from its solution in unchanged di-isopropyl benzene.

2. Process as claimed in claim 1 wherein the sodium hydroxide solution has a concentration of 40 to 50 per cent.

3. Process according to claim 1 wherein the meta-mono-hydroperoxide is recovered as the sodium salt by diluting the solution with petroleum ether and further addition of aqueous sodium hydroxide solution of more than 40 per cent concentration.

4. Process according to claim 1 wherein the meta-mono-hydroperoxide is recovered from its solution in unchanged di-isopropyl benzene by distillation under reduced pressure.

5. Process according to claim 1 wherein the para- and meta-di-isopropyl benzene di-hydroperoxides are removed from the liquid reaction mixture by extraction of said reaction mixture with aqueous sodium hydroxide solution of concentration not substantially greater than 10 per cent.

6. Process according to claim 1 which comprises isolating a major part of the para-di-isopropyl benzene di-hydroperoxides from the cold liquid reaction mixture by filtration, subsequently adding to the filtered solution a liquid hydrocarbon in which the para-di-hydroperoxide is insoluble and which is selected from the group consisting of benzene and petroleum ether, separating the precipitated para-di-hydroperoxide from the solution and treating said solution with aqueous sodium hydroxide solution of a concentration not substantially greater than 10 per cent, whereby the meta-di-hydroperoxide is extracted from the solution containing the para- and meta-mono-hydroperoxides.

7. Process according to claim 1 which comprises recovering the free hydroperoxides from the aqueous solutions of their sodium salts by the addition of acid.

8. Process according to claim 1 wherein the free monohydroperoxides are obtained by hydrolysis of the sodium salts with water.

9. Process for the manufacture of di-isopropyl benzene hydroperoxides which comprises bringing di-isopropyl benzene in the substantially homogeneous liquid phase at temperatures between 110° and 140° C. into intimate contact with free oxygen-containing gases in the substantial absence of oxidation catalysts other than organic peroxides, adding to the reaction mixture alkaline substances which react with acid substances formed during the oxidation reaction, whereby these acid substances are neutralized, removing the para- and meta-di-isopropyl benzene dihydroperoxides from the liquid reaction mixture, then treating the remaining reaction mixture with an aqueous alkali metal hydroxide solution of concentration exceeding 15 per cent whereby the alkali metal salt of the para-di-isopropyl benzene mono-hydroperoxide is precipitated and recovering the meta-monohydroperoxide from its solution in unchanged di-isopropyl benzene.

10. Process for the manufacture of diisopropylbenzene hydroperoxides which comprises bringing diisopropylbenzene in the substantially homogeneous liquid phase at temperatures between 110° and 140° C. into intimate contact with free oxygen-containing gases in the substantial absence of oxidation catalysts other than organic peroxides, adding to the reaction mixture alkaline substances which react with acid substances formed during the oxidation reaction, whereby these acid substances are neutralized, removing diisopropylbenzene dihydroperoxide from the liquid reaction mixture, and then treating the remaining reaction mixture with an aqueous alkali metal hydroxide solution of concentration exceeding 15 per cent to recover diisopropylbenzene monohydroperoxide.

11. Process according to claim 10 wherein the aqueous alkali metal hydroxide solution is aqueous sodium hydroxide.

References Cited in the file of this patent

UNITED STATES PATENTS

| | | |
|---|---|---|
| 1,924,786 | Hartmann et al. | Aug. 29, 1933 |
| 2,527,640 | Lorand et al. | Oct. 31, 1950 |
| 2,547,938 | Hall et al. | Apr. 10, 1951 |
| 2,548,435 | Lorand et al. | Apr. 10, 1951 |
| 2,619,510 | Armstrong et al. | Nov. 25, 1952 |
| 2,632,773 | Armstrong et al. | Mar. 24, 1953 |

FOREIGN PATENTS

| | | |
|---|---|---|
| 646,102 | Great Britain | Nov. 15, 1950 |

OTHER REFERENCES

Hock et al.: Ber., vol. 77, pages 257 to 264 (1944).